US009323105B2

(12) United States Patent
Hsu

(10) Patent No.: US 9,323,105 B2
(45) Date of Patent: Apr. 26, 2016

(54) BACKLIGHT MODULE AND DISPLAY PANEL USING THE SAME

(71) Applicant: AU Optronics Corporation, Hsin-Chu (TW)

(72) Inventor: Chun-Ting Hsu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 14/246,324

(22) Filed: Apr. 7, 2014

(65) Prior Publication Data
US 2015/0117052 A1 Apr. 30, 2015

(30) Foreign Application Priority Data
Oct. 29, 2013 (TW) .............................. 102139103 A

(51) Int. Cl.
F21V 9/16 (2006.01)
G02F 1/1335 (2006.01)
F21V 8/00 (2006.01)
F21K 99/00 (2010.01)

(52) U.S. Cl.
CPC ............ *G02F 1/133615* (2013.01); *F21K 9/52* (2013.01); *F21K 9/56* (2013.01); *F21V 9/16* (2013.01); *G02B 6/0043* (2013.01); *G02F 2001/133614* (2013.01)

(58) Field of Classification Search
CPC .............. F21V 9/16; F21K 9/52; F21K 9/56; G02B 6/0053; G02B 6/0041; G02B 6/0043; G02B 6/003; G02B 6/0015
USPC .................................... 362/84, 627, 629, 606
See application file for complete search history.

(56) References Cited

U.S. PATENT DOCUMENTS

| 7,712,944 | B2* | 5/2010 | Wang | G02B 5/04 362/339 |
| 8,353,613 | B2* | 1/2013 | Choi et al. | 362/607 |
| 8,680,492 | B2* | 3/2014 | Ren et al. | 250/504 R |
| 8,687,147 | B2* | 4/2014 | Chao et al. | 349/68 |
| 8,833,998 | B2* | 9/2014 | Kuo | G02B 6/0088 362/606 |
| 2006/0001036 | A1* | 1/2006 | Jacob et al. | 257/98 |
| 2010/0271807 | A1* | 10/2010 | Chiu | G02F 1/133609 362/97.1 |
| 2012/0106127 | A1 | 5/2012 | Hattori et al. | |
| 2012/0155115 | A1 | 6/2012 | Jang | |
| 2012/0243256 | A1* | 9/2012 | Lee et al. | 362/609 |
| 2012/0252534 | A1 | 10/2012 | Kim et al. | |

(Continued)

FOREIGN PATENT DOCUMENTS

| CN | 102537717 | 7/2012 |
| CN | 102544314 | 7/2012 |

(Continued)

*Primary Examiner* — Peggy Neils
(74) *Attorney, Agent, or Firm* — WPAT, P.C.; Justin King

(57) ABSTRACT

A backlight module includes a frame, a light source, a light guide plate, a wavelength conversion layer, and an optical film group. The light source is disposed in the frame. The light guide plate is disposed in the frame, and the light guide plate includes a light emitting surface, a light incident surface, and at least one side wall. The light source is disposed corresponding to the light incident surface. The side wall connects the light emitting surface and the light incident surface. The wavelength conversion layer is at least disposed on the side wall. The wavelength conversion layer is configured for converting light provided by the light source into white color. The optical film group is disposed on the light emitting surface of the light guide plate.

13 Claims, 8 Drawing Sheets

(56) References Cited

U.S. PATENT DOCUMENTS

2013/0170178 A1* 7/2013 Yoo et al. .................. 362/84
2014/0319995 A1 10/2014 Kim et al.
2015/0085490 A1* 3/2015 Miller et al. ................ 362/259

FOREIGN PATENT DOCUMENTS

| CN | 103148406 A | 6/2013 |
| TW | 201039019 | 11/2010 |
| TW | 201329548 | 7/2013 |

* cited by examiner

BACKLIGHT MODULE AND DISPLAY PANEL USING THE SAME

RELATED APPLICATIONS

This application claims priority to Taiwan Application Serial Number 102139103, filed Oct. 29, 2013, which is herein incorporated by reference.

BACKGROUND

1. Field of Invention

The present invention relates to a backlight module.

2. Description of Related Art

As one of main elements in the backlight module, a light guide plate is configured for enhancing luminance and brightness of the backlight module by guiding the direction of light. In general, the light provided by a light source enters the light guide plate from a light incident surface thereof. Most of the light emits from a light emitting surface of the light guide plate after it passes through the light guide plate. For the light guide plate which is able to convert the color light, the light conversion material can be disposed on the light emitting surface or be added in the light guide plate to convert the color light into a specific color. Although most of the light emits from the light emitting surface, some of the light may emit from the side walls of the light guide plate. This portion of the light may have the original color provided by the light source. The uniformity of the color light of the backlight module may be deteriorated if this portion of the light is mixed with the converted color light.

SUMMARY

An aspect of the present invention provides a backlight module includes a frame, a light source, a light guide plate, a wavelength conversion layer, and an optical film group. The light source is disposed in the frame. The light guide plate is disposed in the frame, and the light guide plate includes a light emitting surface, a light incident surface, and at least one side wall. The light source is disposed corresponding to the light incident surface. The side wall connects the light emitting surface and the light incident surface. The wavelength conversion layer is at least disposed on the side wall. The wavelength conversion layer is configured for converting light provided by the light source into white color. The optical film group is disposed on the light emitting surface of the light guide plate.

In one or more embodiments, the backlight module further includes a reflector disposed between the light guide plate and the frame.

In one or more embodiments, the light source includes a blue light emitting diode configured for providing blue light.

In one or more embodiments, the wavelength conversion layer includes a fluorescent powder or a quantum dot material configured for converting the blue light emitting therein into red light or green light.

In one or more embodiments, a radius of the quantum dot material is substantially about 1-15 nm.

In one or more embodiments, the quantum dot material includes CdSe/ZnS, InP/ZnS, PbSe/PbS, CdSe/CdS, CdTe/CdS or CdTe/ZnS.

In one or more embodiments, the fluorescent powders include $ZnS:Cu^+$, $Al^{3+}$, $SrGa_2S_4:Eu^{2+}$, $Lu_3Al_5O_{12}:Ce^{3+}$, $Y_3Al_5O_{12}:Ce^{3+}$, $CaSiO_4:Eu^{2+}$, $SrSiO_4:Eu^{2+}$, $BaSiO_4:Eu^{2+}$, $MgSiO_4:Eu^{2+}$, $\beta\text{-SiAlON:Eu}^{2+}$, $SrSi_2O_2N_2:Eu^{2+}$, $CaSi_2O_2N_2:Eu^{2+}$, $CaS:Eu^{2+}$, $CrS:Eu^{2+}$, $YVO_4:Eu^{3+}$, $Bi^{3+}$, $CaAlSiN_3:Eu^{2+}$, $SrAlSiN_3:Eu^{2+}$, $Ca_2Si_5N_8:Eu^{2+}$, or $Sr_2Si_5N_8:Eu^{2+}$.

In one or more embodiments, the light incident surface is adjacent to the light emitting surface.

In one or more embodiments, the light guide plate further includes an another side wall disposed opposite to the light incident surface. The another side wall connects adjacent to the light emitting surface and the side wall. The wavelength conversion layer is further disposed on the another side wall.

In one or more embodiments, the light incident surface is disposed opposite to the light emitting surface.

In one or more embodiments, the light guide plate has a wavelength conversion material configured for converting the light incident from the light source into the white light.

In one or more embodiments, the optical film group includes a quantum dot brightness enhancement film, a top prism sheet, a bottom prism sheet, and a diffuser.

Another aspect of the present invention provides a display panel includes the backlight module and a display module disposed on the optical film group.

DETAILED DESCRIPTION

Figure 1:
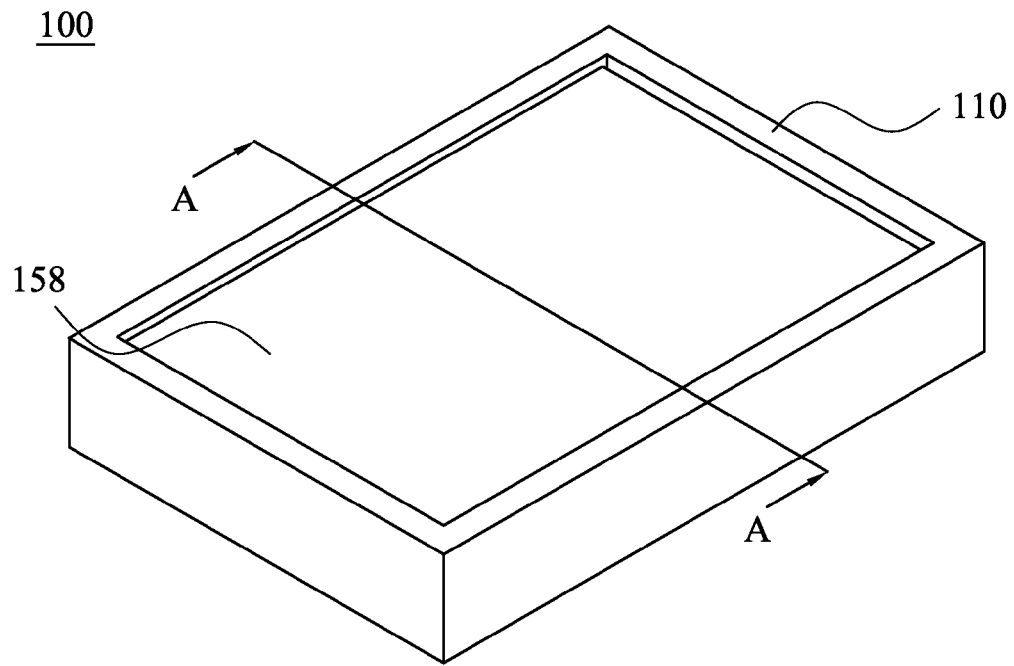
FIG. 1 is a three dimensional view of a backlight module according to one embodiment of the present invention.

Reference will now be made in detail to the present embodiments of the invention, examples of which are illustrated in the accompanying drawings. Wherever possible, the same reference numbers are used in the drawings and the description to refer to the same or like parts.

Figure 2:
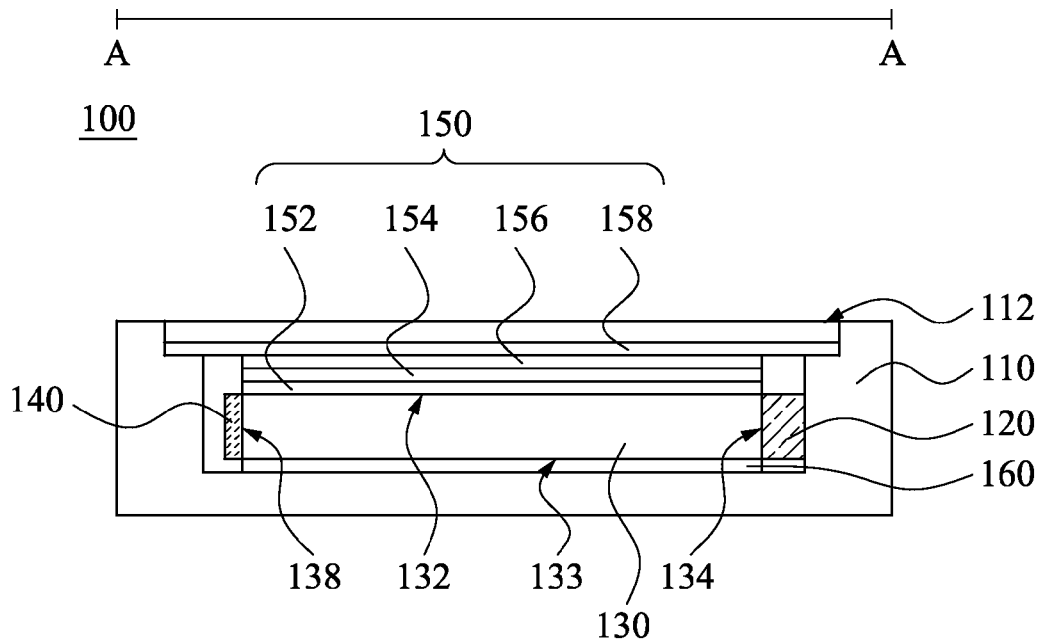
FIG. 2 is a cross-sectional view taking along the section line A-A of FIG. 1 according to the first embodiment.
Figure 3:
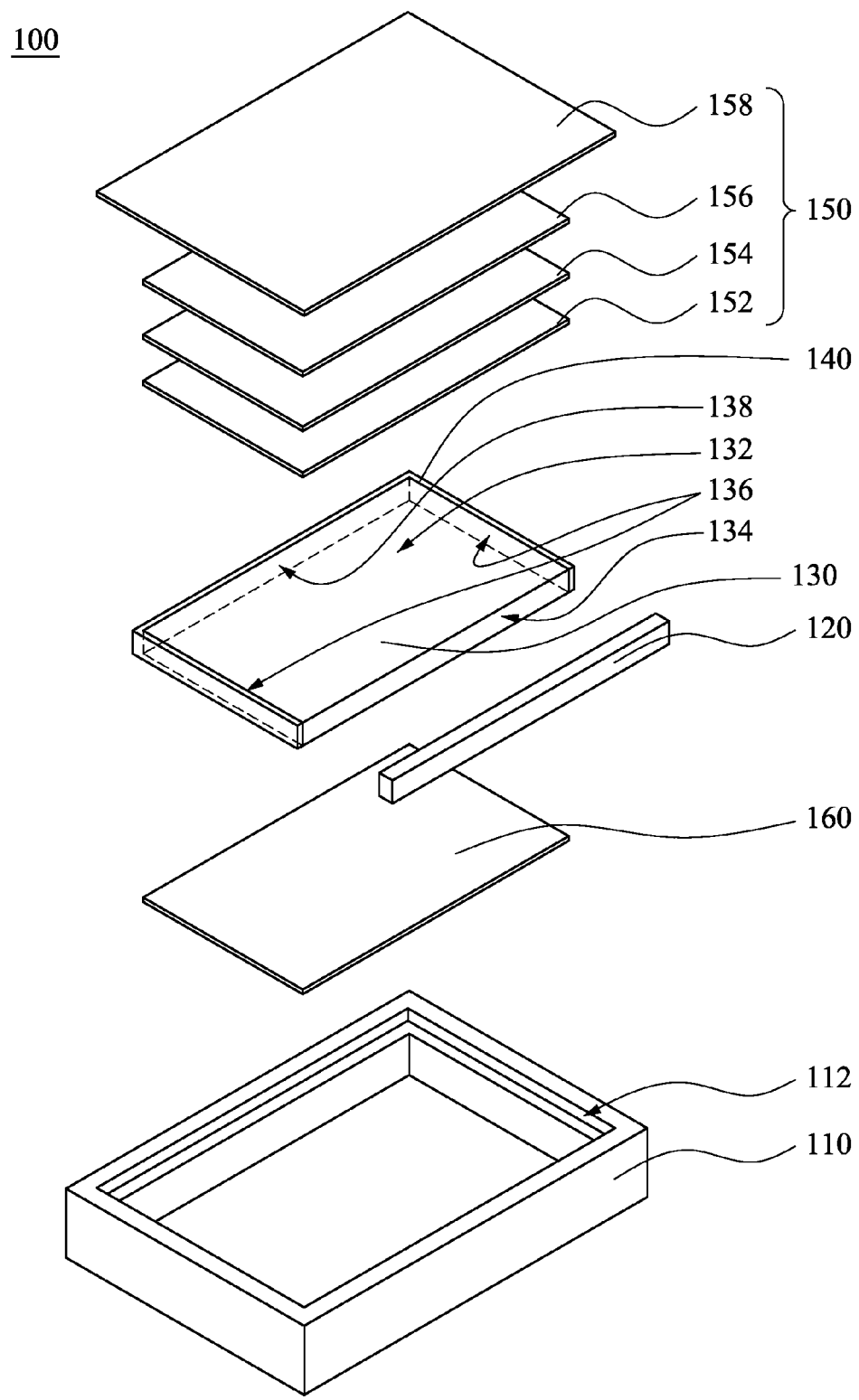
FIG. 3 is an exploded view of a backlight module of FIG. 1 according to the first embodiment.

FIG. 1 is a three dimensional view of a backlight module 100 according to one embodiment of the present invention, FIG. 2 is a cross-sectional view taking along a section line A-A of FIG. 1 according to the first embodiment, and FIG. 3 is an exploded view of the backlight module 100 of FIG. 1 according to the first embodiment. With reference to FIG. 1, FIG. 2, and FIG. 3, in the present embodiment, the backlight module 100 includes a frame 110, a light source 120, a light guide plate 130, a wavelength conversion layer 140, and an optical film group 150. The light source 120 and the light guide plate 130 are disposed in the frame 110. The light guide plate 130 includes a light emitting surface 132, a light incident surface 134, and at least one side wall 136. For example, the light guide plate 130 includes two of the side walls 136 as shown in FIG. 3. The light source 120 is disposed corresponding to the light incident surface 134. The side walls 136 connect the light emitting surface 132 and the light incident surface 134. The wavelength conversion layer 140 is at least disposed on the side walls 136. The wavelength conversion layer 140 is configured for converting light provided by the light source 120 into white color. The optical film group 150 is disposed on the light emitting surface 132 of the light guide plate 130.

In the present embodiment, the light can enter into the light guide plate 130 from the light incident surface 134 is provided by the light source 120 of the backlight module 100. Most of the light emits from the light emitting surface 132 of the light guide plate 130 after it passes through the light guide plate 130. This portion of the light is provided by the backlight module 100. However, another portion of the light may emit from the side walls 136 of the light guide plate 130 and effect the color light of the backlight module 100 if they are mixed with this portion of the light after reflecting by the frame 110. For example, the white light of the backlight module is provided. The color light of the backlight module 100 may be non-uniformity when the color light emits from the side walls 136 is non-white light. However, the wavelength conversion layer 140 is disposed at least on the side walls 136 in the present embodiment. The light emits from the side walls 136 of the light guide plate 130 can be converted into white light by the wavelength conversion layer 140, and then emitted from the backlight module 100. Accordingly, the backlight module 100 of the present invention can improve the uniformity of the color light.

With reference to FIGS. 2 and 3, in this embodiment, the light incident surface 134 is adjacent to the light emitting surface 132. In other words, the backlight module 100 of the present invention is a side-edge backlight module. In greater, detail in FIG. 3, the light incident surface 134 is adjacent to an edge of the light emitting surface 132. The side walls 136 are disposed opposite to each other, and connected to two opposite edges of the light emitting surface 132 and the light incident surface 134 respectively.

In this embodiment, the light guide plate 130 may further include another side wall 138. The side wall 138 is disposed opposite to the light incident surface 134, and the side wall 138 connects adjacent to the light emitting surface 132 and the side walls 136. That is, the light incident surface 134, the side walls 136, and the side wall 138 together surround the edge of the light emitting surface 134. In one or more embodiments, the wavelength conversion layer 140 can be further disposed on the side wall 138 so as to convert the light emitting from the side wall 138 into the white light. In other words, the light can be converted into the white light by passing through the wavelength conversion layer 140 without respect to emit from the side walls 136 or 138. The uniformity of the color light of the backlight module 100 can be improved.

In this embodiment, the light source 120 may include a blue light emitting diode, so as to provide a blue light. Accordingly, the blue light emitted from the light source 120 can enter the light guide plate 130 from the light incident surface 134. After a portion of the blue light passes through the light guide plate 130, it emits from the side walls 136 and 138, and enters the wavelength conversion layer 140. The wavelength conversion layer 140 converts the blue light into the white light. A portion of the white light emits from an opening 112 of the frame 110 after it reflects by the frame 110.

Figure 4A:
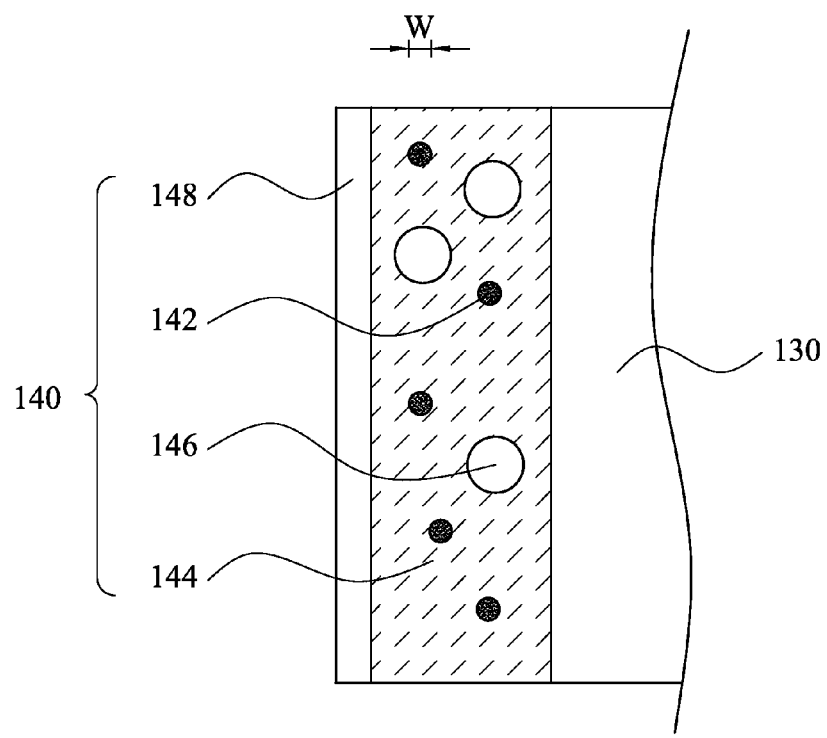
FIG. 4A is an enlarged view of a wavelength conversion layer and a light guide plate of FIG. 2.

Reference is made to FIG. 4A which is an enlarged view of the wavelength conversion layer 140 and the light guide plate 130 in FIG. 2. The wavelength conversion layer 140 may include a quantum dot material 142, so as to convert a portion of the blue light into red light or green light. After a portion of the blue light enters the wavelength conversion layer 140, it turns into the white light by mixing with the red light and the green light. It is noted that the white light is composed of the blue light, the red light, and the green light in this embodiment. The white light with a wider color gamut space is emitted from the backlight module 100, and the color saturation of the white light can be enhanced.

As mentioned above, in this embodiment, the quantum dot material 142 can be a plurality of quantum dots (QDs), such as a mixture of red quantum dots and green quantum dots. The radiuses W of the quantum dots, which are related to the emission wavelength thereof, may be the same or different. In this embodiment, the distribution of the radiuses W of the red quantum dots and the green quantum dots is substantially about 1-15 nm. Furthermore, each of the quantum dots may include a core and a shell covering the core. In one or more embodiments, the material of the core/shell of each of the quantum dots may CdSe/ZnS, InP/ZnS, PbSe/PbS, CdSe/CdS, CdTe/CdS or CdTe/ZnS, but not limited thereto.

Basically, both of the core and the shell of the quantum dot material 142 can be group II-VI, group II-V, group III-VI, group III-V, group IV-VI, group II-IV-VI, group II-IV-V composite material. The material of the core may be ZnS, ZnSe, ZnTe, CdS, CdSe, CdTe, HgS, HgSe, HgTe, AlN, AlP, AlAs, AlSb, GaN, GaP, GaAs, GaSb, GaSe, InN, InP, InAs, InSb, TlN, TlP, TlAs, TlSb, PbS, PbSe, PbTe, or any combination thereof. The material of the shell may be ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, PbS, PbSe, PbTe, or any combination thereof.

In this embodiment, the wavelength conversion layer 140 may include a body 144, and the quantum dot material 142 may be distributed in the body 144. The body 144 may be made of epoxy composites, but not limited thereto. Furthermore, the wavelength conversion layer 140 may further include a plurality of scattering particles 146 distributed in the body 144. The scattering particles 146 are configured for scattering the red light and the green light emitted from the quantum dot material 142, so as to homogenize the red light and the blue light generated from the wavelength conversion layer 140. In other embodiments, the wavelength conversion layer 140 may further include a waterproof layer 148, and the body 144 is disposed between the waterproof layer 148 and the light guide plate 130. The waterproof layer 148 is configured for blocking the external water vapor, so as to extend the life time of the quantum dot material 142. In other embodiments, the wavelength conversion layer 140 may further include another waterproof layer disposed between the body 144 and the light guide plate 130, so as to cover the body 144 with the waterproof layer 148, but the invention is not limited thereto.

Figure 4B:
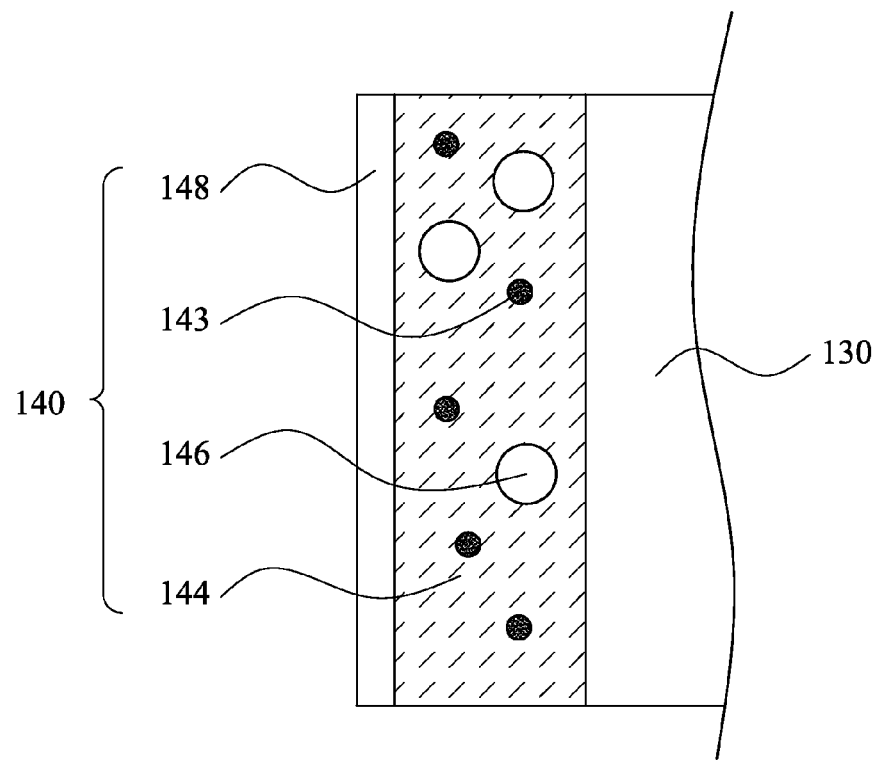
FIG. 4B is an enlarged view of the wavelength conversion layer and the light guide plate of FIG. 2 according to another embodiment.

According to another embodiment, FIG. 4B is an enlarged view of the wavelength conversion layer 140 and the light guide plate 130 in FIG. 2. In this embodiment, phosphor powder 143 can replace the quantum dot material 142 (see FIG. 4A) to convert the portion of the blue light into the red light or the green light. The phosphor powder 143 may include green phosphors, and the green phosphors may be made of $ZnS:Cu^+$, $Al^{3+}$, $SrGa_2S_4:Eu^{2+}$, $Lu_3Al_5O_{12}:Ce^{3+}$, $Y_3Al_5O_{12}:Ce^{3+}$, $CaSiO_4:Eu^{2+}$, $SrSiO_4:Eu^{2+}$, $BaSiO_4:Eu^{2+}$, $MgSiO_4:Eu^{2+}$, $\beta\text{-SiAlON}:Eu^{2+}$, $SrSi_2O_2N_2:Eu^{2+}$, or $CaSi_2O_2N_2:Eu^{2+}$. The phosphor powder 143 may include red phosphors, and the red phosphors may be made of $CaS:Eu^{2+}$, $CrS:Eu^{2+}$, $YVO_4:Eu^{3+}$, $Bi^{3+}$, $CaAlSiN_3:Eu^{2+}$, $SrAlSiN_3:Eu^{2+}$, $Ca_2Si_5N_8:Eu^{2+}$, or $Sr_2Si_5N_8:Eu^{2+}$. Other features of the present embodiment are the same as those of the embodiment of FIG. 4A, and therefore, a description in this regard will not be provided hereinafter.

Reference is made to FIGS. 2 and 3. The color conversion of the light emitting from the side walls 136 and 138 is provided by the above description. The following description provide detailed explanations with respect to the color conversion of the light emit from the light emitting surface 132. In this embodiment, the optical film group 150 includes a quantum dot brightness enhancement film 152, a bottom prism sheet 154, a top prism sheet 156, and a diffuser 158. The quantum dot brightness enhancement film 152 is disposed on the light emitting surface 132, and disposed between the bottom prism sheet 154 and the light guide plate 130. The quantum dot brightness enhancement film 152 is converted the blue light from the light emitting surface 132 into the white light. The quantum dot brightness enhancement film 152 and the wavelength conversion layer 140 may be made by the same material, but the invention is not be limited thereto. In this embodiment, the diffuser 158 may be replaced by multiple brightness enhancement films, or the diffuser 158 may be integrated with the top prism sheet 156, but the invention is not be limited thereto. The bottom prism sheet 154 is disposed between the top prism sheet 156 and the quantum dot brightness enhancement film 152. The top prism sheet 156 is disposed between the diffuser 158 and the bottom prism sheet 154. It is noted that the composition and the configuration of the optical film group 150 mentioned above is used for illustration, and is not intended to limit the invention thereto. Moreover, in this embodiment, the backlight module 100 further includes a reflector 160 disposed between the light guide plate 130 and the frame 110. Taking FIG. 2 as an example, the reflector 160 is disposed adjacent to a bottom surface 133 that is opposite to the light emitting surface 132 of the light guide plate 130. The reflector 160 is configured for guiding the light in the light guide plate 130 to the opening 112 of the frame 110. It can enhance the optical output of the backlight module 100.

The blue light provided by the light source 120 is entered the light guide plate 130 from the light incident surface 134. The blue light is partially entered the quantum dot brightness enhancement film 152 after it is emitted from the light emitting surface 132 directly or reflected to the light emitting surface 132 by the reflector 160. Hence, the quantum dot brightness enhancement film 152 is converted the blue light into the white light. The white light emits from the opening 112 of the frame 110 after it passes through the bottom prism sheet 154, the top prism sheet 156, and the diffuser 158 in sequence. Accordingly, the blue light entering the light guide plate 130 from the light incident surface 134 can be converted into the white light by the wavelength conversion layer 140 or the quantum dot brightness enhancement film 152. No matter the blue light is emitting from the side wall 136, 138 or the light emitting surface 132, and the uniformity of the color light can be improved.

Figure 5:
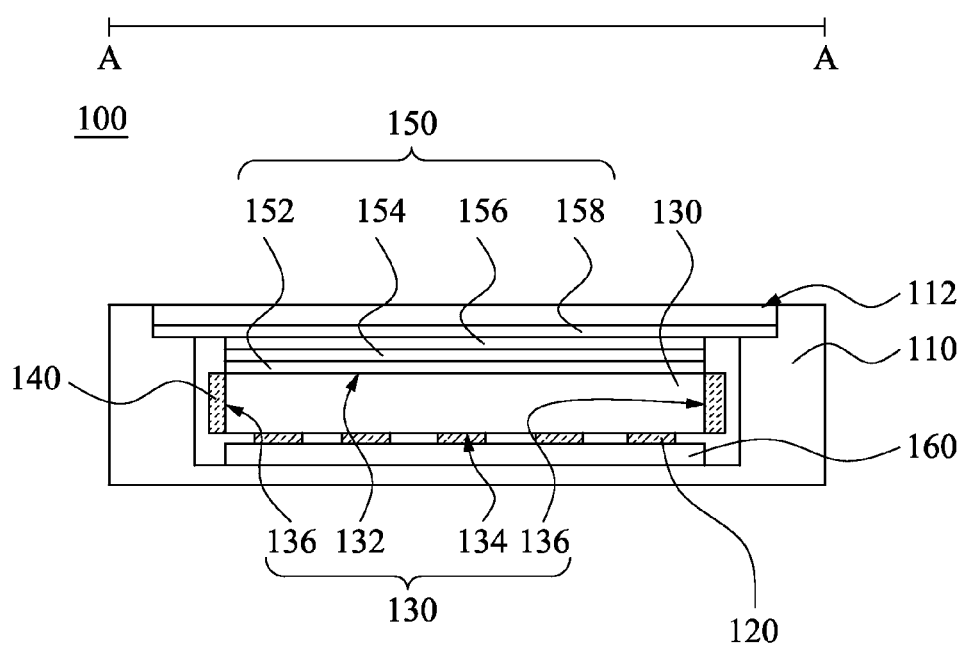
FIG. 5 is a cross-sectional view taking along the section line A-A of FIG. 1 according to the second embodiment.
Figure 6:
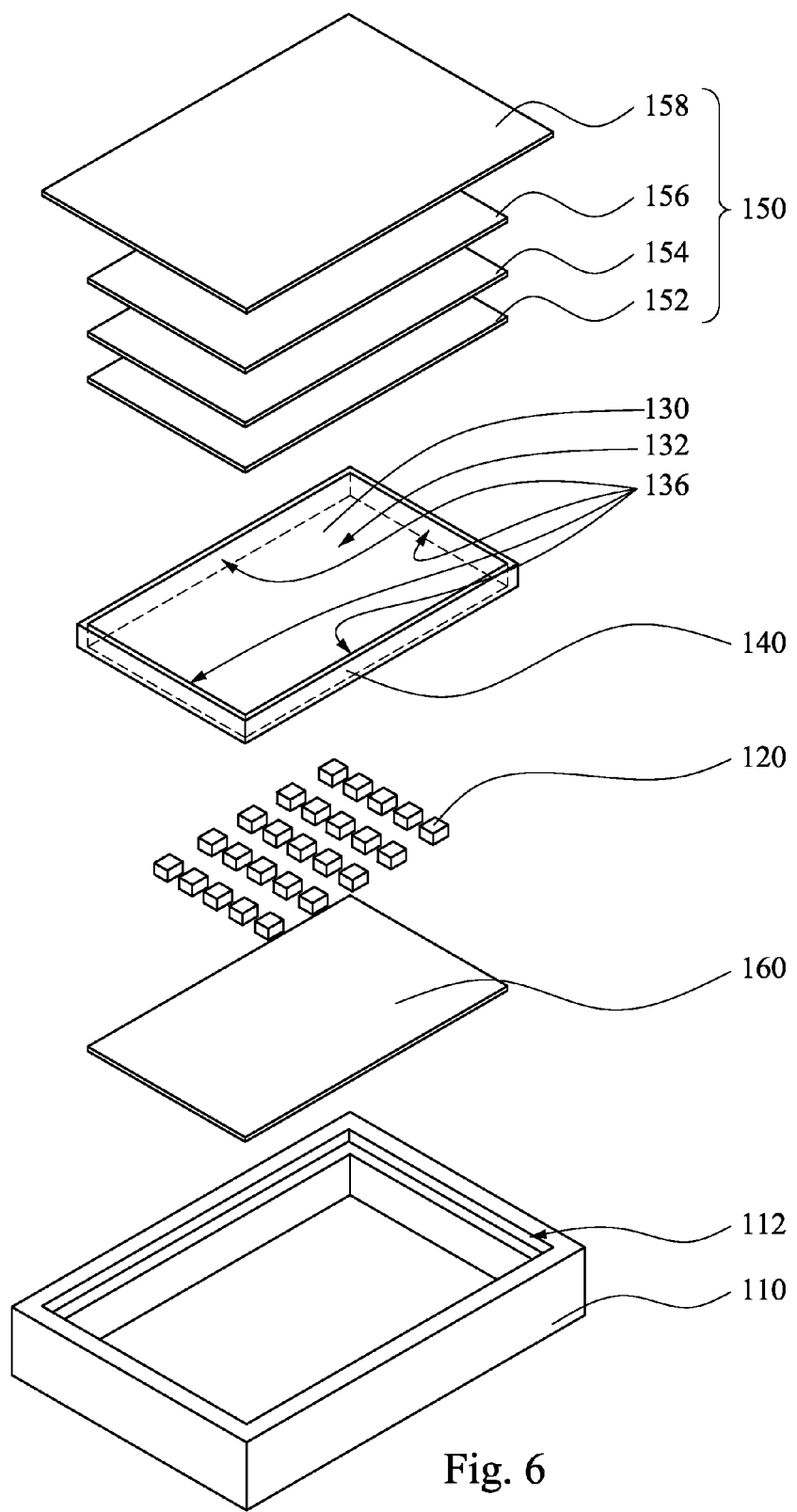
FIG. 6 is an exploded view of the backlight module of FIG. 1 according to the second embodiment.

FIG. 5 is a cross-sectional view taking along line A-A of FIG. 1 according to the second embodiment, and FIG. 6 is an exploded view of the backlight module 100 of FIG. 1 according to the second embodiment. Reference is made to FIGS. 5 and 6. The difference between the second embodiment and the first embodiment is pertained to the position of the light emitting surface 134 and the number of the side wall 136. In this embodiment, the light incident surface 134 is disposed opposite to the light emitting surface 132 as shown in FIG. 5, and there are four of the side wall 136. In other words, the backlight module 100 of the present embodiment is a direct-type back light module. In detail, the light incident surface 134 and the light emitting surface 132 are not connected to each other, and the four side walls 136 are individually connected to the four edges of the light incident surface 134 and the light emitting surface 132. The wavelength conversion layer 140 can cover the four side walls 136. Therefore, the blue light entering the light guide plate 130 from the light incident surface 134 is provided by the light source 120. A portion of the blue light passing through the light guide plate 130 is emitted from the side walls 136, and entered the wavelength conversion layer 140. The wavelength conversion layer 140 converts the blue light into the white light. The white light emits from the opening 112 of the frame 110 after it reflects by the frame 110. Another portion of the blue light emits form the light emitting surface 132 and then enters the quantum dot brightness enhancement film 152. The quantum dot brightness enhancement film 152 converts the blue light into the white light. The white light emits from the opening 112 of the frame 110 after passing through the bottom prism sheet 154, the top prism sheet 156, and the diffuser 158 in sequence. Therefore, the blue light entering the light guide plate 130 can be converted into the white light. No matter the blue light emits from side walls 136 or the light emitting surface 132, and the uniformity of the color light of the backlight module 100 can be improved. Furthermore, the light source 120 can be disposed between the reflector 160 and the light guide plate 130 to enhance the intensity of the blue light entering the light guide plate 130. However, the claimed scope of the invention should not be limited in this respect. The light guide plate 130 of the direct-type backlight module as mentioned above is capable to diffuse a linear light source into a planer light source, or a diffuser can replace the light guide plate 130, and the claimed scope of the invention is not be limited thereto. Other relevant structural details of the second embodiment are all the same as the first embodiment, and, therefore, a description in this regard will not be repeated hereinafter.

Figure 7:
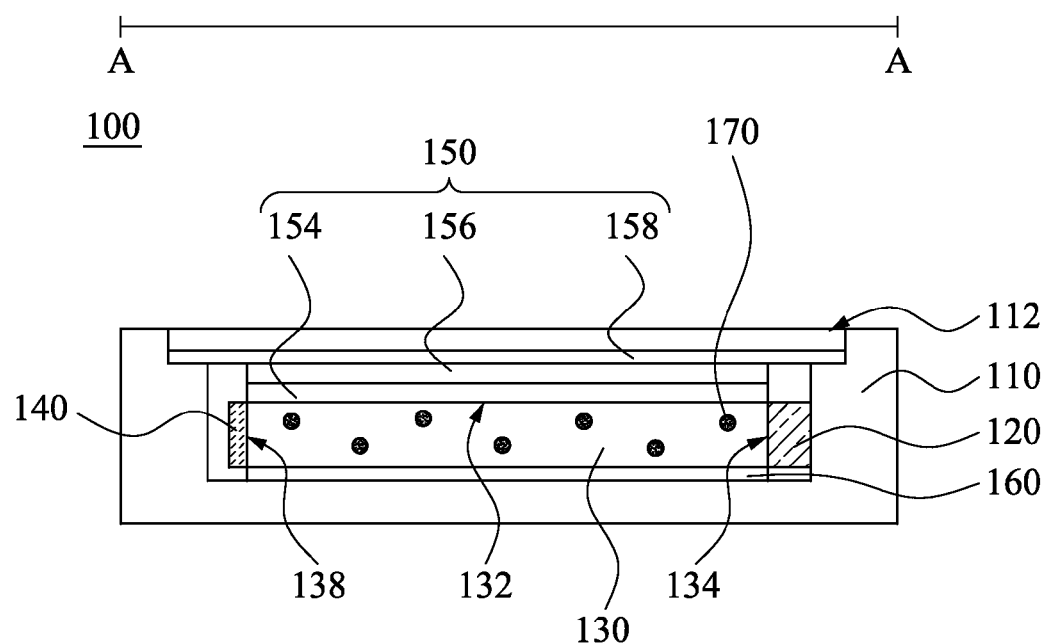
FIG. 7 is a cross-sectional view taking along the section line A-A of FIG. 1 according to the third embodiment.
Figure 8:
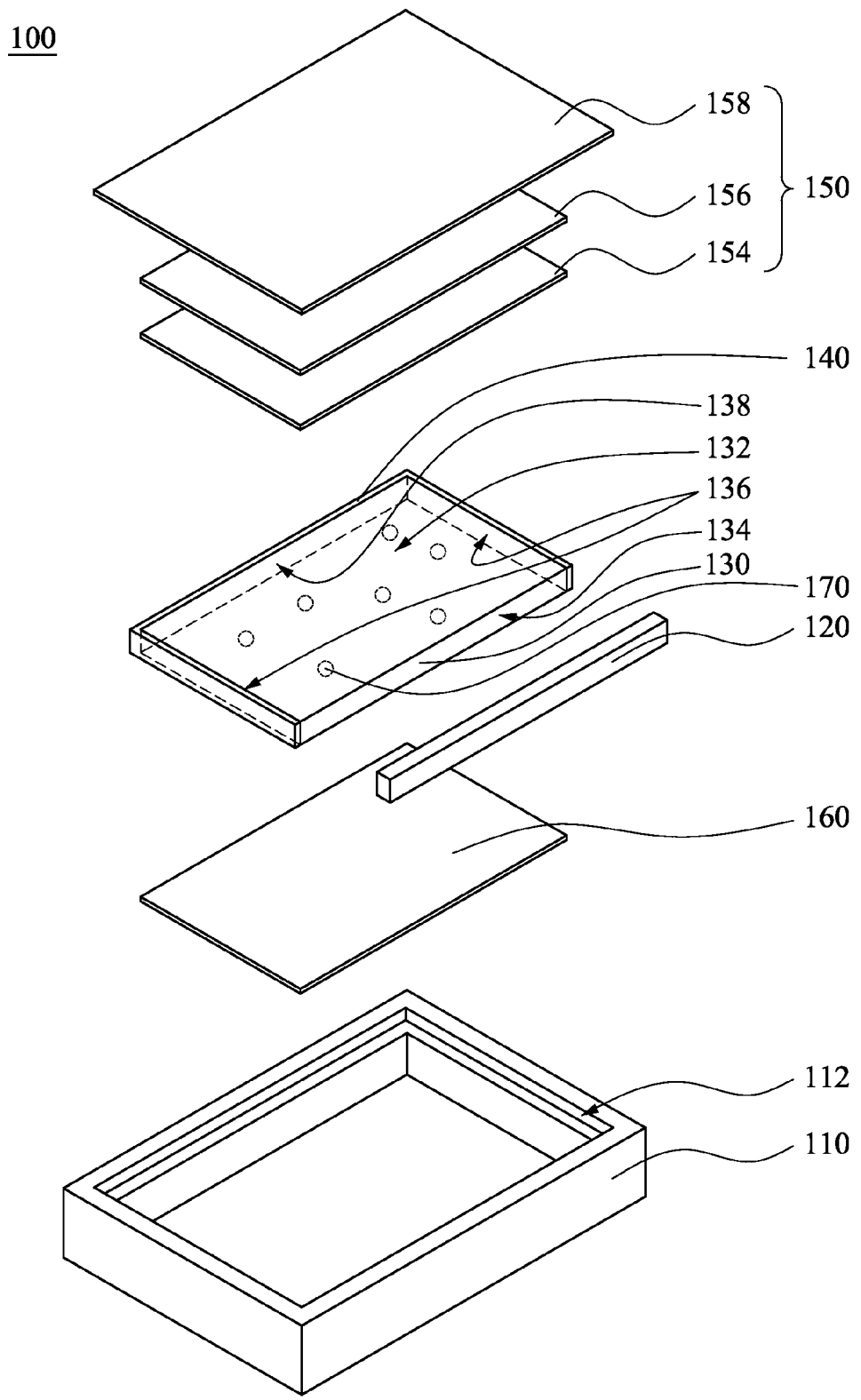
FIG. 8 is an exploded view of the backlight module of FIG. 1 according to the third embodiment.

FIG. 7 is a cross-sectional view taking along line A-A of FIG. 1 according to the third embodiment, and FIG. 8 is an exploded view of the backlight module 100 of FIG. 1 according to the third embodiment. Reference is made to FIGS. 7 and 8. The difference between the third embodiment and the first embodiment pertains to the element of the optical film group 150 and the configuration of wavelength conversion material 170. In this embodiment, the optical film group 150 can include a brightness enhancement film without quantum dots, and the wavelength conversion material 170 can be disposed in the light guide plate 130. The wavelength conversion material 170 is configured for converting a portion of the blue light into the white light. In other words, in this embodiment, the wavelength conversion material 170 can replace the quantum dot brightness enhancement film. In detail, a portion of the blue light is converted into the white light after entering the light guide plate 130 from the light incident surface 134. The white light may emit from the light emitting surface 132 directly or after being reflected by the reflector 160. Another portion of the blue light may emit from the side walls 136 and 138, and enter the wavelength conversion layer 140. The blue light is then converted into the white light by the wavelength conversion layer 140, and then the white light emit from the opening 112 of the frame 110 after being reflected by the frame 110. Therefore, the blue light provided by the light source 120 can be converted into the white light after entering the light guide plate 130. No matter it is emitted from the side walls 136, 138, or the light emitting surface 132. The uniformity of the light color of the backlight module 100 can be improved.

Moreover, in this embodiment, the optical film group 150 disposing on a side of the light guide plate 130 may include the bottom prism sheet 154, the top prism sheet 156, and the diffuser 158, and the claimed scope of the present invention is not limited in this respect. Other relevant structural details of the third embodiment are all the same as the first embodiment, and, therefore, a description in this regard will not be repeated hereinafter. Furthermore, although the backlight module 100 in this embodiment is a side-edge backlight module, the wavelength conversion material 170 can be applied in a direct-type backlight module as mentioned in the second embodiment in other embodiments, and the claimed scope of the present invention is not limited in this respect.

Figure 9:
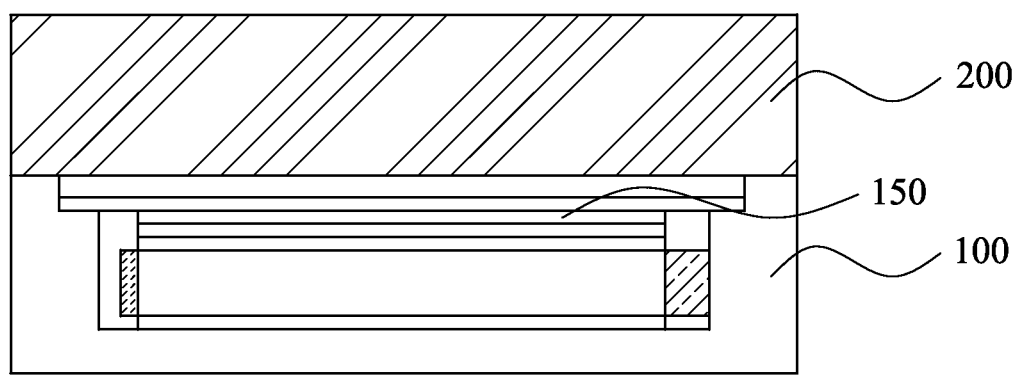
FIG. 9 is a cross-sectional view of a display panel according to one embodiment of the present invention.

Reference is made to FIG. 9 which is a cross-sectional view of a display panel according to one embodiment of the present invention. The display panel includes the backlight module 100 and a display module 200 disposes on the optical film group 150. The display module 200 may include a plurality of pixel units. The white light emitted from the backlight module 100 can be modulated into different pixel images after passing through the pixel units, and the pixel images compose an image shown by the display panel. In one or more embodiments, the display module 200 may be a liquid crystal display module or an electro-wetting display module, and the claimed scope of the present invention is not limited in this respect.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A backlight module, comprising:
   a frame;
   a light source disposed in the frame;
   a light guide plate disposed in the frame, comprising:
      a light emitting surface;
      a light incident surface, wherein the light source is disposed corresponding to the light incident surface; and
      at least one side wall connecting the light emitting surface and the light incident surface;
   a wavelength conversion layer disposed on the entire side wall of the light guide plate and exposing the light incident surface, the wavelength conversion layer configured for converting light provided by the light source into white color; and
   an optical film group disposed on the light emitting surface of the light guide plate.

2. The backlight module of claim 1, further comprising:
   a reflector disposed between the light guide plate and the frame.

3. The backlight module of claim 1, wherein the light source comprises a blue light emitting diode configured for providing blue light.

4. The backlight module of claim 3, wherein the wavelength conversion layer comprises a fluorescent powder or a quantum dot material configured for converting the blue light emitting therein into red light or green light.

5. The backlight module of claim 4, wherein a radius of the quantum dot material is substantially about 1-15 nm.

6. The backlight module of claim 4, wherein the quantum dot material comprise cadmium selenide (CdSe)/zinc sulfide (ZnS), indium phosphide (InP)/ZnS, lead selenide (PbSe)/lead sulfide (PbS), CdSe/cadmium sulfide (CdS), cadmium Tellurium (CdTe)/CdS or CdTe/ZnS.

7. The backlight module of claim 4, wherein the fluorescent powder comprise $ZnS:Cu^+, Al^{3+}$, $SrGa_2S_4:Eu^{2+}$, $Lu_3Al_5O_{12}:Ce^{3+}$, $Y_3Al_5O_{12}:Ce^{3+}$, $CaSiO_4:Eu^{2+}$, $SrSiO_4:Eu^{2+}$, $BaSiO_4:Eu^{2+}$, $MgSiO_4:Eu^{2+}$, $\beta\text{-SiAlON}:Eu^{2+}$, $SrSi_2O_2N_2:Eu^{2+}$, $CaSi_2O_2N_2:Eu^{2+}$, $CaS:Eu^{2+}$, $CrS:Eu^{2+}$, $YVO_4:Eu^{3+}, Bi^{3+}$, $CaAlSiN_3:Eu^{2+}$, $SrAlSiN_3:Eu^{2+}$, $Ca_2Si_5N_8:Eu^{2+}$, or $Sr_2Si_5N_8:Eu^{2+}$.

8. The backlight module of claim 1, wherein the light incident surface is adjacent to the light emitting surface.

9. The backlight module of claim 8, wherein the light guide plate further comprises an another side wall, the another side wall is disposed opposite to the light incident surface, and the another side wall connects adjacent to the light emitting surface and the side wall, wherein the wavelength conversion layer is further disposed on the another side wall.

10. The backlight module of claim 1, wherein the light incident surface is disposed opposite to the light emitting surface.

11. The backlight module of claim 10, wherein the light guide plate has a wavelength conversion material configured for converting the light incident from the light source into the white light.

12. The backlight module of claim 1, wherein the optical film group comprises:
   a quantum dot brightness enhancement film, a top prism sheet, a bottom prism sheet, and a diffuser.

13. A display panel, comprising:
   the backlight module of claim 1; and
   a display module disposed on the optical film group.

* * * * *